United States Patent
Garyali et al.

(10) Patent No.: US 8,112,745 B2
(45) Date of Patent: Feb. 7, 2012

(54) APPARATUS AND METHOD FOR CAPABILITIES VERIFICATION AND RESTRICTION OF MANAGED APPLICATIONS IN AN EXECUTION ENVIRONMENT

(75) Inventors: Piyush Garyali, Bangalore (IN); Ziad M. Kaakani, Scottsdale, AZ (US); Vivek B. Varma, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 1308 days.

(21) Appl. No.: 11/386,373

(22) Filed: Mar. 22, 2006

(65) Prior Publication Data

US 2007/0240136 A1    Oct. 11, 2007

(51) Int. Cl.
*G06F 9/45* (2006.01)
*G06F 9/44* (2006.01)

(52) U.S. Cl. ......... 717/148; 717/140; 717/162; 717/163
(58) Field of Classification Search ........................ None
See application file for complete search history.

(56) References Cited

U.S. PATENT DOCUMENTS

| | | | |
|---|---|---|---|
| 6,546,546 | B1 | 4/2003 | Van Doorn |
| 2002/0016865 | A1* | 2/2002 | Yanagi et al. ................. 709/315 |
| 2004/0015568 | A1 | 1/2004 | Kaakani et al. |
| 2005/0097549 | A1* | 5/2005 | Chu et al. ...................... 717/178 |
| 2005/0172286 | A1* | 8/2005 | Brumme et al. ................. 718/1 |

FOREIGN PATENT DOCUMENTS

WO    WO 02/19076 A2    3/2002

OTHER PUBLICATIONS

"CDC Runtime Guide," Sun Microsystems, www.sun.com, see esp. section 1.6, Aug. 2005, 88 pages.
"Common Language Infrastructure (CLI) Partitions I to VI, Standard ECMA-335," ECMA International, 4th Edition, Jun. 2006, see esp. Partition IV, 539 pages.

* cited by examiner

*Primary Examiner* — Lewis A Bullock, Jr.
*Assistant Examiner* — Mark Gooray

(57) ABSTRACT

A method includes identifying one or more features of an execution environment to be used by an application during execution and determining if use of the one or more features is restricted. The method also includes, if use of the one or more features is not restricted, compiling and executing the application in the execution environment. The method further includes, if use of any of the one or more features is restricted, blocking execution of the application in the execution environment. Determining if the use of the one or more features is restricted may include using a configuration list or a profile identified using a custom attribute. The configuration list or the profile identifies features that are available for use in the execution environment and/or features that cannot be used in the execution environment.

22 Claims, 8 Drawing Sheets

APPARATUS AND METHOD FOR CAPABILITIES VERIFICATION AND RESTRICTION OF MANAGED APPLICATIONS IN AN EXECUTION ENVIRONMENT

CROSS-REFERENCE TO RELATED APPLICATIONS

This application is related to the following U.S. patent applications:

Ser. No. 11/175,848 entitled "DETERMINISTIC RUNTIME EXECUTION ENVIRONMENT AND METHOD" filed on Jul. 6, 2005; and Ser. No. 11/175,703 entitled "APPARATUS AND METHOD FOR DETERMINISTIC GARBAGE COLLECTION OF A HEAP MEMORY" filed on Jul. 6, 2005;

both of which are hereby incorporated by reference.

TECHNICAL FIELD

This disclosure relates generally to computing systems and more specifically to an apparatus and method for capabilities verification and restriction of managed applications in an execution environment.

BACKGROUND

Several attempts have been made to create "execution environments" in which certain types of computer programs are executed. In general, a conventional execution environment provides support for basic features that many programs assume are available for use. For example, conventional execution environments typically include support for performing various mathematical functions (such as sine and cosine operations), input/output functions (such as reading and writing files), and communication functions (such as network and database access). Some conventional execution environments provide additional features, such as just-in-time compilation of code, machine independence and portability, remote operation, and enhanced internetworking. Conventional execution environments that support these additional features are generally referred to as "virtual machines." The Common Language Infrastructure (CLI) by MICROSOFT CORPORATION and JAVA by SUN MICROSYSTEMS are examples of execution environments.

Conventional execution environments often support a large number of features that are available for use by programs being executed, and some of these features may be inappropriate for use in certain situations. For example, restricting user-level applications from using particular features may be helpful in complying with programming policies. These programming policies may establish guidelines to help ensure that programs do not perform undesirable operations, such as operations that can negatively impact overall system performance. However, other programs executed in the conventional execution environments, such as system-level applications, may require access to the complete range of features offered in the execution environments. This often makes it difficult to restrict the use of features in conventional execution environments.

SUMMARY

This disclosure provides an apparatus and method for capabilities verification and restriction of managed applications in an execution environment.

In a first embodiment, a method includes identifying one or more features of an execution environment to be used by an application during execution and determining if use of the one or more features is restricted. The method also includes, if use of the one or more features is not restricted, compiling and executing the application in the execution environment. The method further includes, if use of any of the one or more features is restricted, blocking execution of the application in the execution environment.

In particular embodiments, determining if use of the one or more features is restricted includes determining if each of the one or more features is identified in a configuration list. The configuration list identifies at least one of: features that are available for use in the execution environment and features that cannot be used in the execution environment. In more particular embodiments, the one or more features comprise one or more methods provided by at least one system library, and the method further includes pre-compiling each of the one or more methods identified in the configuration list as being available for use in the execution environment.

In other particular embodiments, determining if use of the one or more features is restricted includes identifying an attribute associated with the application and identifying a profile associated with the attribute. The profile identifies at least one of: features that are available for use in the execution environment and features that cannot be used in the execution environment. In more particular embodiments, the one or more features are provided by one or more system libraries, and the method further includes pre-compiling each of the one or more system libraries that are associated with the profile.

In a second embodiment, an apparatus includes at least one memory capable of storing an application to be executed in an execution environment. The apparatus also includes at least one processor capable of identifying one or more features of the execution environment to be used by the application during execution and determining if use of the one or more features is restricted. The at least one processor is also capable of, if use of the one or more features is not restricted, initiating compilation and execution of the application in the execution environment. The at least one processor is further capable of, if use of any of the one or more features is restricted, blocking execution of the application in the execution environment.

In a third embodiment, a computer program is embodied on a computer readable medium and is operable to be executed by a processor. The computer program includes computer readable program code for identifying one or more features of an execution environment to be used by an application during execution and determining if use of the one or more features is restricted. The computer program also includes computer readable program code for, if use of the one or more features is not restricted, initiating compilation and execution of the application in the execution environment. In addition, the computer program includes computer readable program code for, if use of any of the one or more features is restricted, blocking execution of the application in the execution environment.

In a fourth embodiment, a method includes identifying one or more features of an execution environment to be used by an application during execution and determining if use of the one or more features is restricted. The method also includes, if use of the one or more features is not restricted, providing the application to an apparatus for compilation and execution of the application in the execution environment at the apparatus.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
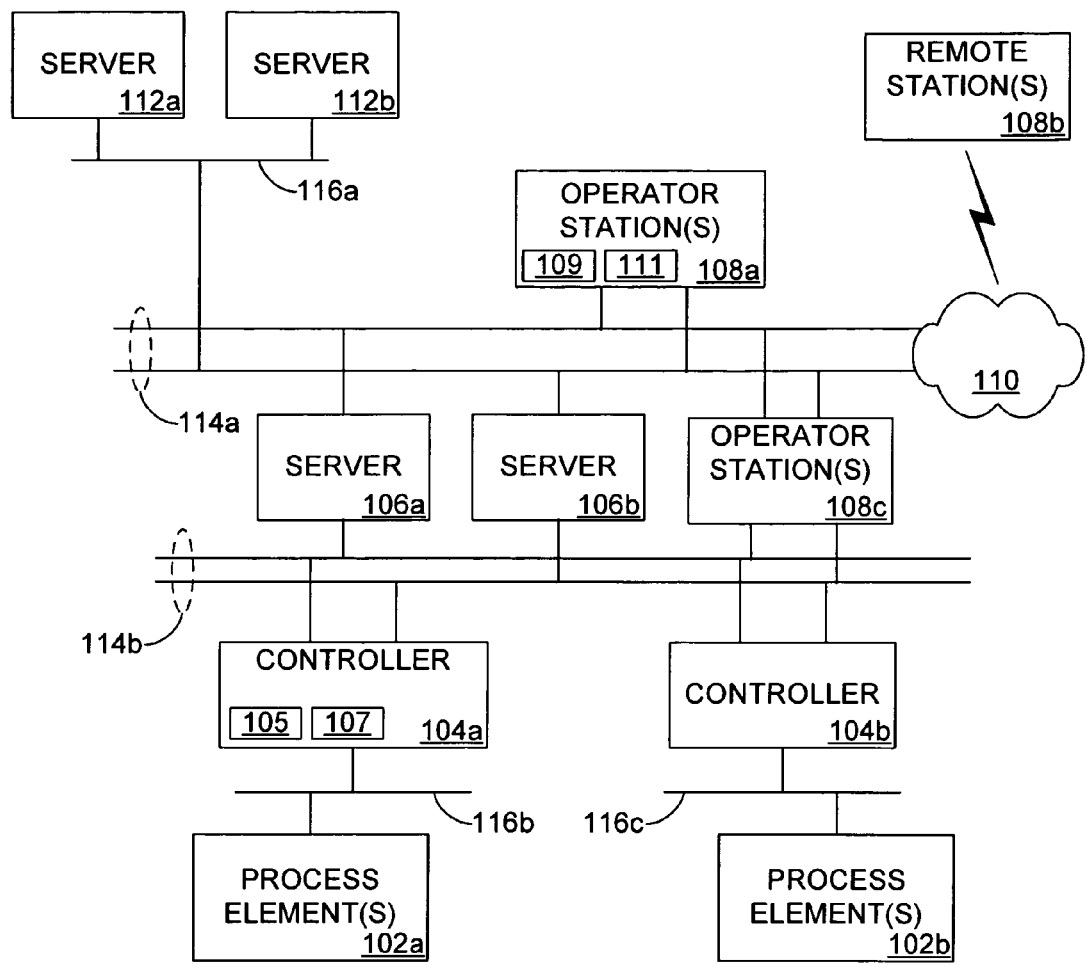
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a-102b. The process elements 102a-102b represent components in a process or production system that may perform any of a wide variety of functions. For example, the process elements 102a-102b could represent motors, catalytic crackers, valves, and other industrial equipment in a production environment. The process elements 102a-102b could represent any other or additional components in any suitable process or production system. Each of the process elements 102a-102b includes any hardware, software, firmware, or combination thereof for performing one or more functions in a process or production system.

Two controllers 104a-104b are coupled to the process elements 102a-102b. The controllers 104a-104b control the operation of the process elements 102a-102b. For example, the controllers 104a-104b could be capable of providing control signals to the process elements 102a-102b periodically. Each of the controllers 104a-104b includes any hardware, software, firmware, or combination thereof for controlling one or more of the process elements 102a-102b. Each of the controllers 104a-104b could, for example, include one or more processors 105 and one or more memories 107 storing data and instructions used by the processor(s) 105. The processors 105 could include processors of the POWERPC processor family running the GREEN HILLS INTEGRITY operating system or processors of the X86 processor family running a MICROSOFT WINDOWS operating system.

Two servers 106a-106b are coupled to the controllers 104a-104b. The servers 106a-106b perform various functions to support the operation and control of the controllers 104a-104b and the process elements 102a-102b. For example, the servers 106a-106b could log information collected or generated by the controllers 104a-104b, such as status information related to the operation of the process elements 102a-102b. The servers 106a-106b could also execute applications that control the operation of the controllers 104a-104b, thereby controlling the operation of the process elements 102a-102b. In addition, the servers 106a-106b could provide secure access to the controllers 104a-104b. Each of the servers 106a-106b includes any hardware, software, firmware, or combination thereof for providing access to or control of the controllers 104a-104b. The servers 106a-106b could, for example, represent personal computers (such as desktop computers) executing a MICROSOFT WINDOWS operating system. As another example, the servers 106a-106b could include processors of the POWERPC processor family running the GREEN HILLS INTEGRITY operating system or processors of the X86 processor family running a MICROSOFT WINDOWS operating system.

One or more operator stations 108a-108b are coupled to the servers 106a-106b, and one or more operator stations 108c are coupled to the controllers 104a-104b. The operator stations 108a-108b represent computing or communication devices providing user access to the servers 106a-106b, which could then provide user access to the controllers 104a-104b and the process elements 102a-102b. The operator stations 108c represent computing or communication devices providing user access to the controllers 104a-104b (without using resources of the servers 106a-106b). As particular examples, the operator stations 108a-108c could allow users to review the operational history of the process elements 102a-102b using information collected by the controllers 104a-104b and/or the servers 106a-106b. The operator stations 108a-108c could also allow the users to adjust the operation of the process elements 102a-102b, controllers 104a-104b, or servers 106a-106b. Each of the operator stations 108a-108c includes any hardware, software, firmware, or combination thereof for supporting user access and control of the system 100. Each of the operator stations 108a-108c could, for example, include one or more processors 109 and one or more memories 111 storing data and instructions used by the processor(s) 109. In particular embodiments, the operator stations 108a-108c could represent personal computers executing a MICROSOFT WINDOWS operating system.

In this example, at least one of the operator stations 108b is remote from the servers 106a-106b. The remote station is coupled to the servers 106a-106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a-112b. The servers 112a-112b execute various applications to control the overall operation of the system 100. For example, the system 100 could be used in a processing or production plant or other facility, and the servers 112a-112b could execute applications used to control the plant or other facility. As particular examples, the servers 112a-112b could execute applications such as enterprise resource planning (ERP), manufacturing execution system (MES), or any other or additional plant or process control applications. Each of the servers 112a-112b includes any hardware, software, firmware, or combination thereof for controlling the overall operation of the system 100.

As shown in FIG. 1, the system 100 includes various redundant networks 114a-114b and single networks 116a-116c that support communication between components in the system 100. Each of these networks 114a-114b, 116a-116c represents any suitable network or combination of networks facilitating communication between components in the system 100. The networks 114a-114b, 116a-116c could, for example, represent Ethernet networks.

In one aspect of operation, the controllers 104a-104b execute, support, or otherwise provide access to an execution environment. The execution environment provides support for various features that managed applications may use during execution. As examples, the execution environment could provide support for mathematical functions, input/output functions, and communication functions. The phrase "managed application" refers to an application executed in the execution environment, where the execution of the application is managed by the execution environment. A managed application could, for example, include control logic that is used to control one or more process elements 102a-102b.

In particular embodiments, the execution environment used in the controllers 104a-104b to execute the managed applications is deterministic. A deterministic execution environment is an execution environment whose behavior is predictable or that can be precisely specified. The execution environment could be implemented in any suitable manner, such as by using .NET programming based on the Common Language Interface (CLI) specification as ratified by ECMA-335 and support both the kernel and compact profiles. Additional information about an example deterministic execution environment may be found in the two patent applications incorporated by reference above.

In these embodiments, the controllers 104a-104b or other components in the system 100 execute, support, or otherwise provide a mechanism for verifying and restricting the capabilities of managed applications executed in the execution environment. Among other things, the capabilities of a managed application may include the ability of the managed application to use particular features of the execution environment. For example, this verification and restriction could include ensuring that a managed application does not attempt to invoke restricted methods in system libraries of the execution environment. As a particular example, the controllers 104a-104b or other system components could ensure that only applications configured to run in an embedded .NET CLI execution environment are executed and that they are executed only after the features used by the applications have been verified (i.e. the applications are allowed to invoke those features).

Any suitable technique could be used to perform capabilities verification and restriction. For example, in some embodiments, the controllers 104a-104b perform the capabilities verification during pre-compilation of a managed application. In other embodiments, a user device (such as an operator station 108a) performs the capabilities verification before a managed application is downloaded or otherwise provided to a controller. Example techniques for capabilities verification and restriction are shown in FIGS. 3 through 8, which are described below.

Although FIG. 1 illustrates one example of a process control system 100, various changes may be made to FIG. 1. For example, a control system could include any number of process elements, controllers, servers, and operator stations. Also, FIG. 1 illustrates one operational environment in which capabilities verification and restriction could be used. The capabilities verification and restriction mechanism could be used in any other suitable process control or non-process control device or system.

Figure 2:
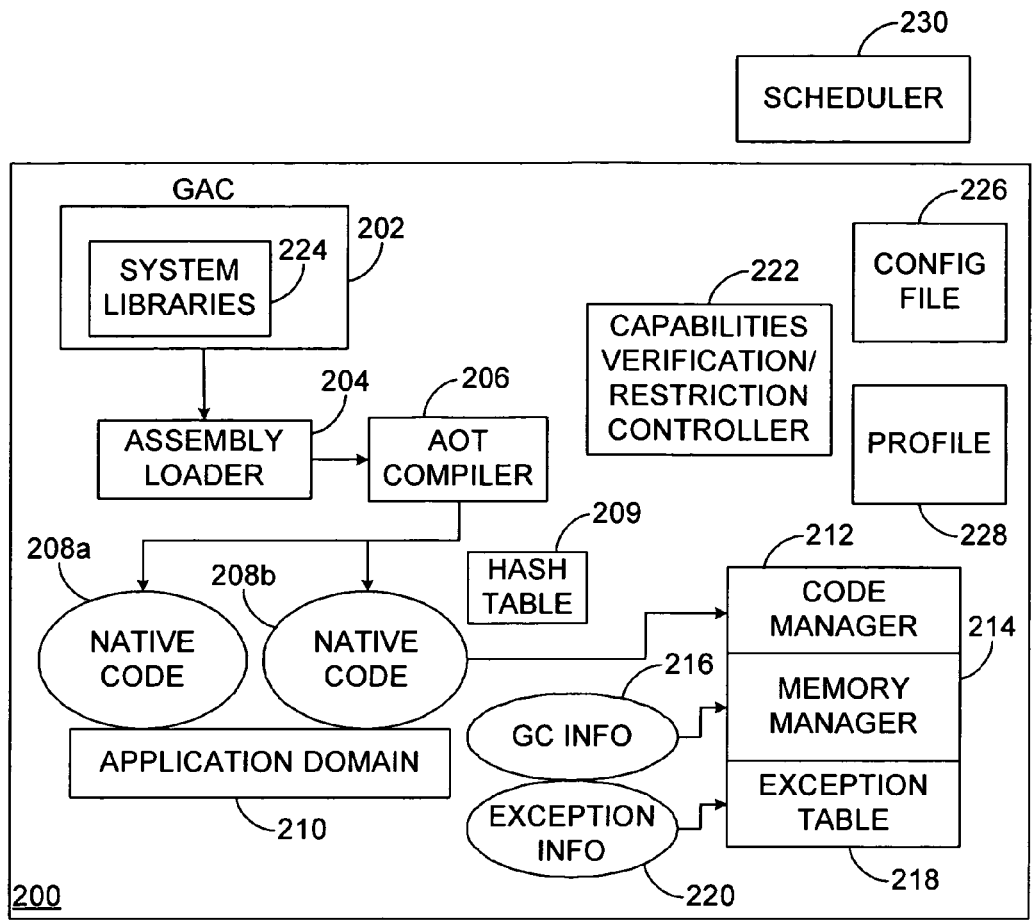
FIG. 2 illustrates an example execution environment according to one embodiment of this disclosure.

FIG. 2 illustrates an example execution environment 200 according to one embodiment of this disclosure. The embodiment of the execution environment 200 shown in FIG. 2 is for illustration only. Other embodiments of the execution environment could be used without departing from the scope of this disclosure. Also, for ease of explanation, the execution environment 200 is described as being implemented in the controllers 104a-104b of FIG. 1, although the execution environment 200 could be used in any other suitable device or system.

In this example embodiment, the execution environment 200 includes a global assembly cache (GAC) 202. The global assembly cache 202 represents a memory capable of storing different assembly code programs to be executed in the execution environment 200. For example, the assembly code programs could represent assembly code versions of control logic for controlling one or more of the process elements 102a-102b of FIG. 1. The global assembly cache 202 could store multiple assembly code programs and/or different versions of the same assembly code program. The global assembly cache 202 represents any suitable storage and retrieval device or devices.

An assembly loader 204 loads assembly code into the execution environment 200 for execution. For example, the assembly loader 204 may retrieve new assembly code downloaded into the global assembly cache 202. The assembly loader 204 may then load the identified assembly code into a compiler for compilation and use in the execution environment 200. The assembly loader 204 includes any hardware, software, firmware, or combination thereof for loading assembly code for compilation. The assembly loader 204 could, for example, represent a software thread executed in the background of the execution environment 200.

An ahead-of-time (AOT) compiler 206 compiles the assembly code loaded by the assembly loader 204. The AOT compiler 206 represents a load-time compiler that compiles assembly code when the assembly code is loaded. For example, the AOT compiler 206 may convert assembly code from an intermediate language to native executable code capable of being executed in the execution environment 200. Also, the AOT compiler 206 could insert instructions into the native executable code to ensure proper execution of the code in the execution environment 200. The AOT compiler 206 may be said to represent a "pre-compiler" because code is compiled at load time and prior to execution time or runtime. The AOT compiler 206 includes any hardware, software, firmware, or combination thereof for compiling assembly code. The AOT compiler 206 could, for example, represent a software thread executed in the background of the execution environment 200. In particular embodiments, the AOT compiler 206 is capable of performing selective pre-compilation, where the AOT compiler 206 selectively compiles only the methods to be used by a particular managed application (as opposed to a complete pre-compilation in which all methods from all assembly code programs referenced by a managed application are compiled).

The AOT compiler 206 produces native executable code, such as native executable codes 208a-208b. The native executable codes 208a-208b represent executable code capable of being executed in the execution environment 200. The native executable codes 208a-208b could provide any suitable functionality in the execution environment 200. For example, the native executable codes 208a-208b could represent executable versions of control logic used to control one or more process elements 102a-102b of FIG. 1. The native executable codes 208a-208b could provide any other or additional functionality in the execution environment 200.

In this example, the native executable codes 208a-208b are stored in a memory (such as memory 107), and a hash table 209 identifies the starting memory address for each of the native executable codes 208a-208b. When a particular native executable code is desired, the hash table 209 is used to identify the starting address for that native executable code, and the native executable code is then retrieved from memory using that starting address. The hash table 209 represents any suitable structure or structures for storing addresses to compiled code. In particular embodiments, a structure (such as a MonoMethod structure) may be used as a key to access the hash table 209.

One or more application domains 210 represent the domains in which the native executable codes 208a-208b are executed in the execution domain 200. Each application domain 210 represents any suitable domain for executing one or more native executable codes 208a-208b. While shown as a single application domain 210 in FIG. 2, multiple application domains 210 could be used.

The assembly codes and native executable codes in the execution environment 200 are managed by a code manager 212. For example, the code manager 212 may control the loading and unloading of assembly code into and out of the execution environment 200. As a particular example, the code manager 212 could cause the assembly loader 204 to load assembly code into the AOT compiler 206, which generates native executable code that is loaded into the application domain 210. The code manager 212 could also unload native executable code from the application domain 210. The code manager 212 includes any hardware, software, firmware, or combination thereof for managing assembly code and/or compiled code used in the execution environment 200. The code manager 212 could, for example, represent a software thread executed in the background of the execution environment 200.

The execution environment 200 also includes a memory manager 214. The memory manager 214 manages the use of memory, such as a heap memory. For example, the memory manager 214 could allocate blocks of memory to managed applications being executed in an application domain 210. The memory manager 214 could also use garbage collection information 216 to release blocks of memory that are no longer being used by the managed applications. The garbage collection information 216 could, for example, be generated by a garbage collection process provided by the memory manager 214 and executed in the background of the execution environment 200. In addition, the memory manager 214 could support a defragmentation process for the memory. The defragmentation process could be used to combine unused blocks of memory into larger blocks. The memory manager 214 includes any hardware, software, firmware, or combination thereof for managing memory. The memory manager 214 could, for example, represent a deterministic memory manager. The memory manager 214 could also represent a software thread executed in the background of the execution environment 200.

The execution environment 200 further includes an exception table 218, which stores exception information 220. The exception information 220 identifies various problems experienced in the execution environment 200. Example problems could include attempting to load assembly code that does not exist in an explicitly specified location or in the global assembly cache 202, an error during compilation of loaded assembly code, or attempting to unload assembly code not previously loaded. An application or process being executed in the execution environment 200 could generate an exception identifying a detected problem. The exception is identified by the exception information 220, which is stored in the exception table 218 for later use (such as during debugging) or for use by the application or process for automatic recovery at runtime.

In addition, the execution environment 200 includes a capabilities verification and restriction controller 222. The capabilities verification and restriction controller 222 supports the verification and/or restriction of the capabilities of managed applications executed in the execution environment 200. For example, the capabilities verification and restriction controller 222 could verify whether a managed application attempts to use restricted features of the execution environment 200. The capabilities verification and restriction controller 222 could also take any suitable action when the attempted use of restricted features is detected, such as raising an exception or blocking/stopping execution of a managed application.

In some embodiments, the capabilities verification and restriction controller 222 operates to restrict access to features provided by one or more system libraries 224. The system libraries 224 may, for example, define methods that can be invoked by managed applications. As a particular example, the system libraries 224 could provide methods that can be invoked by the native executable codes 208a-208b during execution. The capabilities verification and restriction controller 222 controls access to the methods in the system libraries 224, thereby restricting the features that are available to the managed applications.

The capabilities verification and restriction controller 222 may use any suitable technique to restrict access to the methods provided by one or more system libraries 224. For example, in some embodiments, the capabilities verification and restriction controller 222 uses a configuration file 226. The configuration file 226 may identify the methods in the system libraries 224 that can be used by the managed applications and/or the methods in the system libraries 224 that cannot be used by the managed applications. In particular embodiments, only the methods in the system libraries 224 that are identified by the configuration file 226 may be compiled and converted into native executable code for use by the managed applications. Other methods (the methods not listed in the configuration file 226) are not compiled into native executable code for use by the managed applications.

Entries in the configuration file 226 could have any suitable format, such as:

<Assembly>:<Namespace>:<Class>:<Method>:<Token>.

This type of entry identifies a token, a method name, a class name, a namespace name, and a system library name. As a particular example, assume that the use of the method System.Console.WriteLine is allowed. The configuration file 226 may contain the following entry:

Mscorlib.dll:System:Console:WriteLine:0600072B.

The token may be used to distinguish between overloaded methods and to ensure identification and restriction or use of the correct method. The methods from one or multiple system libraries 224 could be identified in one or multiple configuration files 226.

In other embodiments, the capabilities verification and restriction controller 222 uses one or more profiles 228. Each profile 228 defines the methods in the system libraries 224 that can or cannot be used by a managed application. Each profile 228 is also associated with an attribute. A managed application may include or be associated with an attribute identifying one of the profiles 228, and the capabilities verification and restriction controller 222 uses the identified profile 228 to control the features available to that managed application.

Among other things, this could allow user-defined applications to be executed in the same execution environment 200 as other applications (such as applications designed by manufacturers of the controllers 104a-104b). For example, the user-defined applications could be restricted as needed so that they do not negatively impact the operation of the controllers 104a-104b. At the same time, the other applications may be given access to a wider range of features (such as by using a different profile or configuration list).

The capabilities verification and restriction controller 222 includes any hardware, software, firmware, or combination thereof for capabilities verification and/or restriction. The capabilities verification and restriction controller 222 could, for example, represent a software thread executed in the background of the execution environment 200. In particular embodiments, the capabilities verification and restriction controller 222 could form part of or cooperate with the AOT compiler 206. This may allow the capabilities verification and restriction controller 222 to participate in the compilation of system libraries and other assembly code programs.

A scheduler 230 is used to schedule execution of the managed applications in the execution environment 200. The scheduler 230 may also be used to schedule execution of housekeeping tasks in the execution environment 200. The housekeeping tasks include, among other things, memory management, assembly loading and unloading, assembly compilation, and capabilities verification and/or restriction. For example, the scheduler 230 could support time slicing to allow multiple threads to be executed, where the threads represent the housekeeping tasks and the managed applications. The scheduler 230 includes any hardware, software, firmware, or combination thereof for scheduling the execution of applications and other tasks.

In some embodiments, the various components shown in FIG. 2 operate over a platform/operating system abstraction layer. The platform/operating system abstraction layer logically separates the execution environment 200 from the underlying hardware platform or operating system. In this way, the execution environment 200 may be used with different hardware platforms and operating systems without requiring the execution environment 200 to be specifically designed for a particular hardware platform or operating system.

Although FIG. 2 illustrates one example of an execution environment 200, various changes may be made to FIG. 2. For example, the functional division shown in FIG. 2 is for illustration only. Various components in FIG. 2 could be combined or omitted and additional components could be added according to particular needs.

Figure 3:
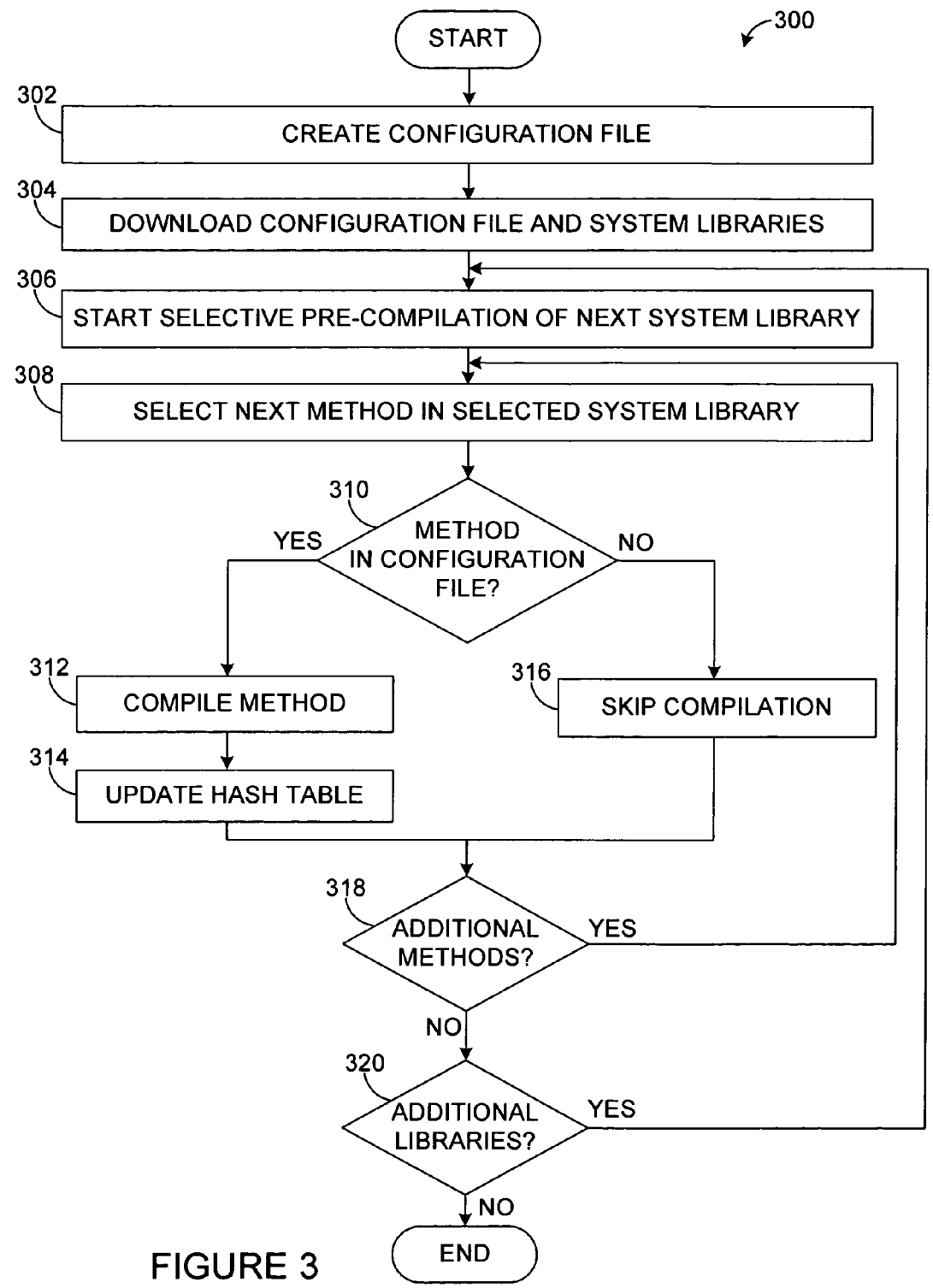
FIG. 3 illustrates an example method for loading and compiling system libraries using a configuration file according to one embodiment of this disclosure.

FIG. 3 illustrates an example method 300 for loading and compiling system libraries using a configuration file according to one embodiment of this disclosure. For ease of explanation, the method 300 is described with respect to the controller 104a in the process control system 100 of FIG. 1 operating using the execution environment 200 of FIG. 2. The method 300 could be used by any other suitable device and in any other suitable system.

As described above, the AOT compiler 206 may compile system libraries 224 using a configuration file 226. In some embodiments, the AOT compiler 206 performs selective pre-compilation of the system libraries 224, compiling only those methods in the system libraries 224 that are listed in or identified by the configuration file 226. In particular embodiments, the configuration file 226 is used to inform the execution environment 200 of the namespace/class/methods that can be compiled and executed, thus restricting the methods in the system libraries 224 that are converted into native executable code and made available to the managed applications for use.

As shown in FIG. 3, a configuration file is created at step 302. This may include, for example, a user using an operator station to create or edit a configuration file 226. The configuration file 226 could be created manually, or a tool could be used to at least partially automate the creation process. As a particular example, a tool could allow a user to identify one or more system libraries, and the tool could automatically identify the various methods defined by those system libraries. The tool could then allow the user to identify the allowed methods and/or the disallowed methods, and the tool could automatically generate a configuration file 226 having entries with the proper format.

The configuration file and one or more system libraries are downloaded to a controller at step 304. This may include, for example, the user downloading the configuration file 226 and one or more system libraries 224 into a memory 107 of the controller 104a.

The controller 104a starts a selective pre-compilation of the next system library at step 306. This may include, for example, the code manager 212 causing the assembly loader 204 to load one of the system libraries 224 into the AOT compiler 206 for compilation.

The controller 104a selects the next method in the loaded system library at step 308. This may include, for example, the capabilities verification and restriction controller 222 selecting the next method contained in the system library 224 loaded into the AOT compiler 206.

The controller 104a determines if the selected method is identified by or listed in the configuration file at step 310. This may include, for example, the capabilities verification and restriction controller 222 determining if an entry in the configuration file 226 identifies the selected method. An entry in the configuration file 226 could be located using a token associated with the selected method or in any other suitable manner.

If the selected method is identified by or listed in the configuration file, the controller 104a compiles the selected method at step 312 and updates a hash table at step 314. This may include, for example, the AOT compiler 206 compiling the selected method into native executable code. This may also include storing the native executable code in memory and storing the starting address of the native executable code in the hash table 209. If the selected method is not identified by or listed in the configuration file, the controller 104a skips the selected method at step 316, meaning the controller 104a does not compile the selected method.

The controller 104a determines if any additional methods in the current system library remain to be processed at step 318. If so, the controller 104a returns to step 308 to select the next method from the current system library 224. Otherwise, the controller 104a determines if any additional system libraries remain to be processed at step 320. If so, the controller 104a returns to step 306 to initiate a selective pre-compilation of the next system library 224.

In this manner, the controller 104a only converts methods identified by or listed in the configuration file 226 into native executable code. The controller 104a skips compilation of the methods that are not identified by or listed in the configuration file 226, so these methods would not have starting memory addresses listed in the hash table 209. As a result, the methods not identified by or listed in the configuration file 226 would be unavailable for use by a managed application.

Figure 4A:
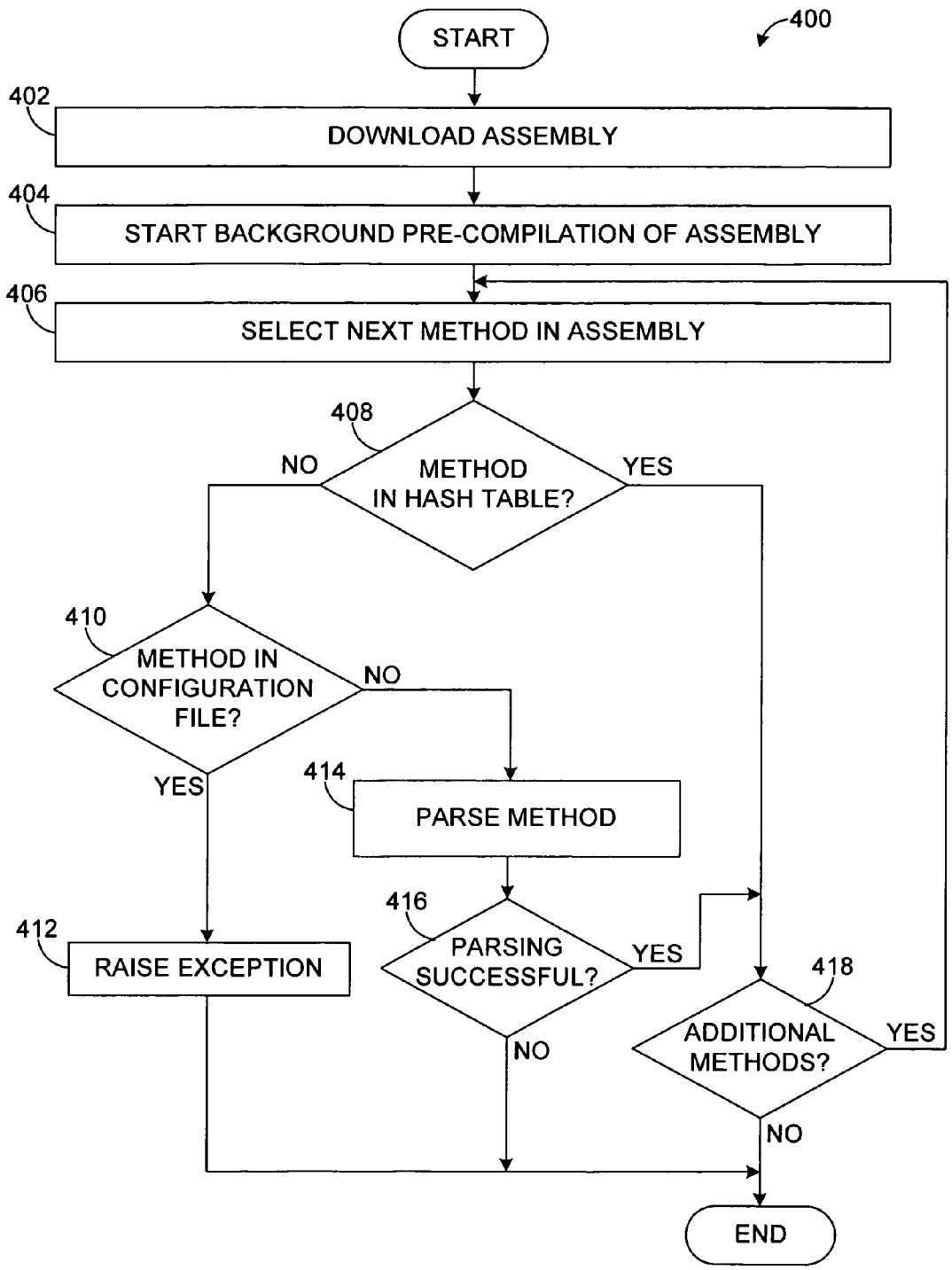
FIGS. 4A and 4B illustrate an example method for capabilities verification and restriction performed at runtime according to one embodiment of this disclosure.
Figure 4B:
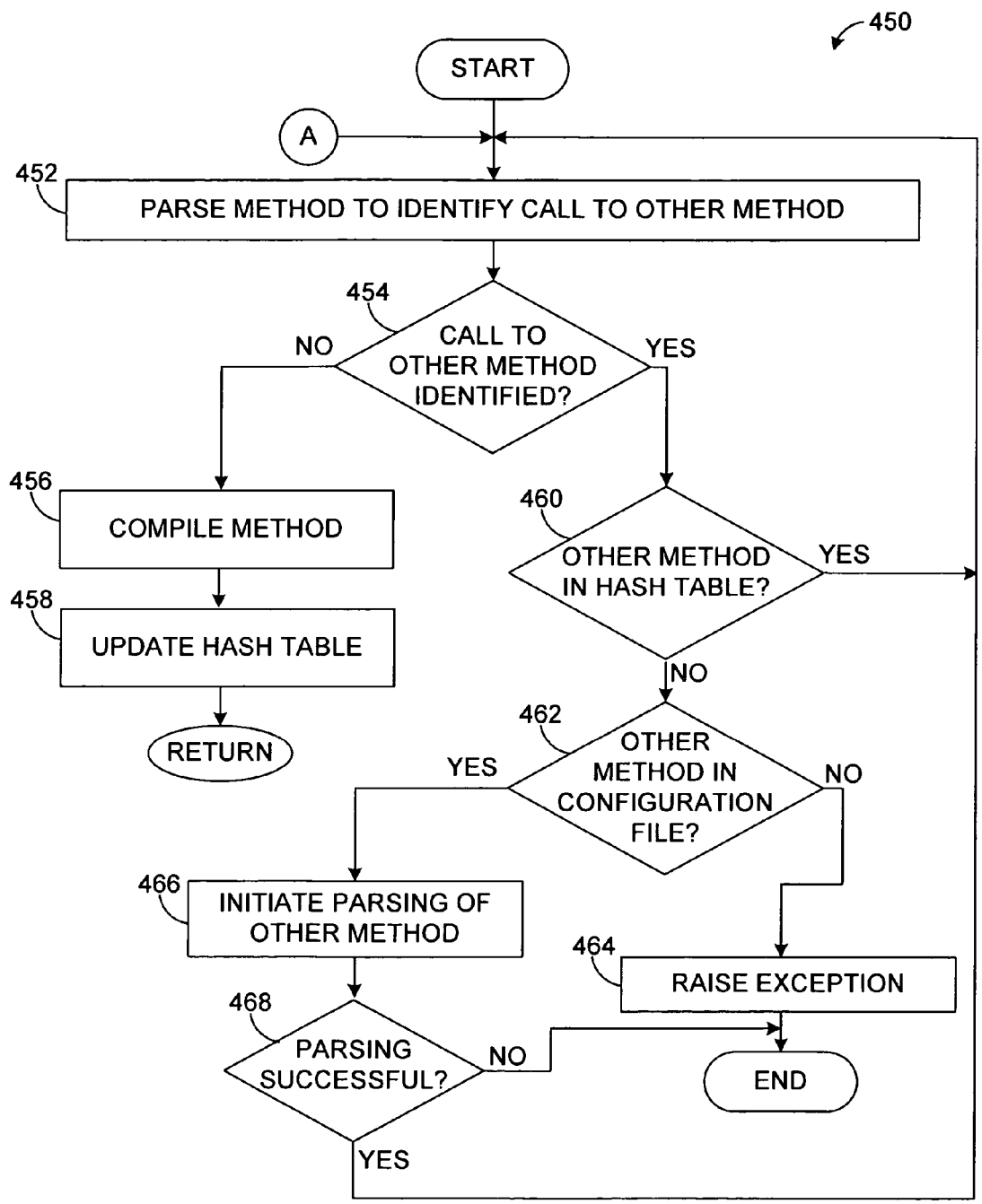

FIGS. 4A and 4B illustrate an example method for capabilities verification and restriction performed at runtime according to one embodiment of this disclosure. In particular, FIG. 4A illustrates an example method 400 for capabilities verification and restriction, and FIG. 4B illustrates how to recursively parse methods in an assembly code program during the method 400 of FIG. 4A. For ease of explanation, the method 400 is described with respect to the controller 104a in the process control system 100 of FIG. 1 operating using the execution environment 200 of FIG. 2. The method 400 could be used by any other suitable device and in any other suitable system.

As shown in FIG. 4A, an assembly code program is downloaded to a controller at step 402. This may include, for example, a user using an operator station to download an assembly code program into the memory 107 of the controller 104a. The controller 104a could have previously selectively pre-compiled one or more system libraries 224 using the method 300 of FIG. 3.

The controller starts a background pre-compilation of the assembly code program at step 404. This may include, for example, the code manager 212 causing the assembly loader 204 to load the assembly code program into the AOT compiler 206 for compilation.

The controller selects the next method in the assembly code program at step 406. This may include, for example, the capabilities verification and restriction controller 222 selecting the next method contained in the loaded assembly code program.

The controller determines if the selected method already has a starting memory address listed in a hash table at step 408. This may include, for example, the capabilities verification and restriction controller 222 using the structure of the selected method as a hash key to access the hash table 209. If the selected method already has a starting address listed in the hash table 209, this means that use of the selected method is allowed (not restricted) and that the selected method has already been compiled. As a result, compilation of the selected method is not required at this point, and the controller skips to step 418 to determine if any additional methods in the assembly code program remain to be processed. If so, the controller 104a returns to step 406 to select the next method. Otherwise, the method 400 ends with a compiled assembly code program.

If the selected method does not have a starting address listed in the hash table at step 408, the controller determines if the selected method is identified by or listed in the configuration file at step 410. Even though the selected method was not previously pre-compiled, it is possible that use of the selected method is still permissible. As a result, the capabilities verification and restriction controller 222 determines if an entry in the configuration file 226 identifies the selected method. If not, the controller raises an exception at step 412, and the method 400 ends. In this case, use of the selected method is not allowed by the assembly code program being compiled, and an exception is raised to inform a user or the program of the error.

If the selected method is identified by or listed in the configuration file, the controller parses the selected method at step 414. The parsing represents a recursive process where all methods invoked by the selected method are identified, verified, and compiled before the selected method is compiled. FIG. 4B illustrates an example method 450 for recursively parsing a selected method in an assembly code program. If the controller determines that the parsing is successful at step 416, the controller proceeds to step 418. Otherwise, the parsing was not successful, and the method 400 ends.

As shown in FIG. 4B, the recursive parsing of a selected method may occur as follows. The controller begins parsing a selected method to identify a method call at step 452. This may include, for example, the controller 104a examining the selected method and identifying the next method call (if any) in the selected method.

If no other method calls are identified in the selected method at step 454, the selected method is compiled at step 456, and the hash table is updated at step 458. In this case, the selected method does not invoke any other methods, or the selected method invokes one or more other methods that have already been identified, verified, and compiled. In either case, the selected method may be compiled by the controller, and the controller returns to whatever function invoked the parsing. This could include returning to step 414 in FIG. 4A or (as described in more detail below) returning to step 466 in FIG. 4B.

If a call to another method is identified in the selected method at step 454, the controller determines if the other identified method has a starting memory address listed in a hash table at step 460. If so, the controller returns to step 452 to continue parsing the selected method. Otherwise, the controller determines if the other method is identified by or listed in the configuration file at step 462. If not, the controller raises an exception at step 464, and the parsing ends with an error. In this case, the controller 104a has identified at least one attempt by the assembly code program to use a restricted method.

If the other method is identified by or listed in the configuration file, the controller initiates parsing of the other method at step 466. This may include, for example, the controller 104a invoking the method 450 of FIG. 4B for the other method. If the parsing of the other method is successful, the controller returns to step 452 to continue parsing the selected method. Otherwise, the parsing ends, and the unsuccessful parsing of the other method results in an exception being raised.

The following represents one specific example of how the method 400 may operate to provide capabilities verification and restriction. This example is for illustration only. The method 400 could operate in any other suitable manner according to particular situations or implementations.

Suppose the controller 104a executes function block algorithms to perform various functions (such as controlling the process element 102a), and the scheduler 230 schedules execution of the function block algorithms. In particular embodiments, the scheduler 230 may be implemented as an executable ".exe" program, and the function block algorithms may be implemented as dynamic link libraries or ".dll" files. Assume that all system libraries 224 have been pre-compiled using a configuration file 226 (such as by using the method 300 of FIG. 3).

A user may download a new function block algorithm into the execution environment 200, such as by using HON.Assembly.Load( ). Assembly.Load( ) is an embedded .NET method for loading assemblies into an execution stream at runtime. HON.Assembly.Load( ) is a modified version of Assembly.Load( ), which ensures that the new function block algorithm is pre-compiled on a background thread without disturbing the foreground execution of existing controls in the execution environment 200.

During pre-compilation of the new function block algorithm, the controller 104a ensures that the new function block algorithm does not use any feature outside the scope of the configuration file 226. For example, the configuration file 226 may indicate that all methods from the mscorlib.dll system library 224 are allowed, except for the method named System.Console.ReadLine. This means that the System.Console.ReadLine method is not listed in the configuration file 226, the System.Console.ReadLine method is not pre-compiled into native executable code, and no compiled code corresponding to the System.Console.ReadLine method is identified by the hash table 209. However, suppose the new function block algorithm includes a method Function01 that calls the method System.Console.ReadLine.

In this situation, the controller 104a may operate as follows. The controller 104a parses the method Function01 and locates a call to the method System.Console.ReadLine. The controller 104a accesses the hash table 209 and determines that the method System.Console.ReadLine has not been compiled. Because the method System.Console.ReadLine was not previously compiled, the controller 104a accesses the configuration file 226 to determine if use of the method System.Console.ReadLine is allowed. The controller 104a could, for example, search the configuration file 226 using the token associated with the method System.Console.ReadLine. If the method System.Console.ReadLine was identified by or listed in the configuration file 226, the controller 104a would compile the method. However, in this situation, the method System.Console.ReadLine is not listed in the configuration file 226, and the controller 104a generates an exception. In this case, the use of a restricted feature by the new function block algorithm has been detected and prevented by the controller 104a.

Figure 5:
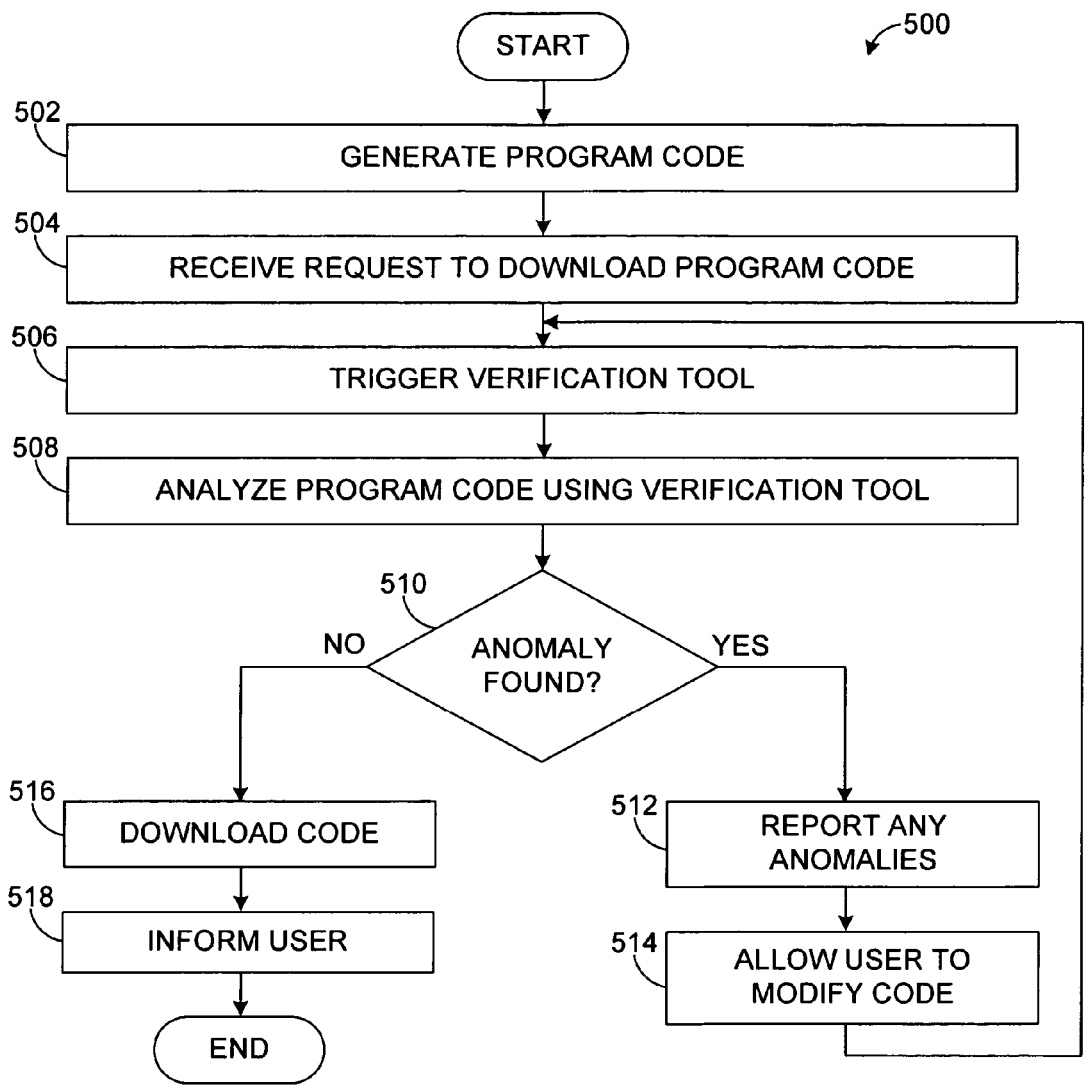
FIG. 5 illustrates an example method for capabilities verification and restriction performed before runtime according to one embodiment of this disclosure.

FIG. 5 illustrates an example method 500 for capabilities verification and restriction performed before runtime according to one embodiment of this disclosure. For ease of explanation, the method 500 is described with respect to the operator station 108a in the process control system 100 of FIG. 1. The method 500 could be used by any other suitable device and in any other suitable system.

As described above, FIGS. 4A and 4B illustrate how the controller 104a may operate to verify and restrict the capabilities of a managed application. FIG. 5 illustrates how an offline verification tool can be used by the operator station 108a or other user device to verify and restrict the capabilities of a managed application before the managed application is provided to the controller 104a. The offline verification tool may implement the same or similar verification technique used in the method 400 of FIGS. 4A and 4B. For example, the offline verification tool may use the same configuration file 226 and implement parsing functionality to locate any possible anomalies in a user's code before the user's code is downloaded to the controller 104a (although the offline verification tool could also use the profiles 228 to verify the user's code). As a particular example, the offline verification tool could represent a software tool executed by the processor 109 in the operator station 108a. The method 500 may be used by the operator station 108a instead of or in addition to the method 400 used by the controller 104a.

In the following description, the operator station 108a is assumed to include or execute a process builder application. This represents a tool through which users (such as function block developers) can create control strategies using function blocks, generate code in the form of .NET assemblies (.dll files), and download the assemblies into the execution environment 200 of the controller 104a. The process builder could, for example, represent a CONTROL BUILDER application from HONEYWELL INTERNATIONAL, INC. In particular embodiments, the offline verification tool could form part of the process builder's last stage of operation, where the process builder verifies the capabilities of a program being created before the program is downloaded into a controller.

As shown in FIG. 5, program code is generated at step 502. This may include, for example, a user manually creating a function block algorithm or using a process builder application to create a function block algorithm. As a particular example, the function block algorithm could implement a control strategy for controlling one or more process elements 102a-102b.

A request to download the generated program code is received at step 504. This may include, for example, the user invoking a function of the process builder to download the generated function block algorithm to a controller 104a.

An offline verification tool is triggered at step 506. This may include, for example, the process builder triggering an external offline verification tool or an internal offline verification tool provided by the process builder itself.

The offline verification tool analyzes the generated program code at step 508. This may include, for example, the offline verification tool parsing the generated function block algorithm to identify methods invoked by the function block algorithm. This may also include the offline verification tool using a configuration file 226 or profiles 228 to identify any invocations of restricted methods.

The offline verification tool determines if any anomalies are found in the generated program code at step 510. This may include, for example, determining if the offline verification tool has located any invocations of restricted methods. If so, any anomalies are reported to the user at step 512. This may include, for example, the offline verification tool identifying the specific line in the generated function block algorithm that appears to invoke a restricted method. The user is given the opportunity to correct the program code at step 514, and the method 500 returns to step 506 to re-verify the program code.

If no anomalies are found in the generated program code, the generated program code is downloaded to a controller at step 516, and the user is informed of a successful verification and download at step 518. This may include, for example, the process builder downloading the verified function block algorithm into the memory 107 of the controller 104a.

Figure 6:
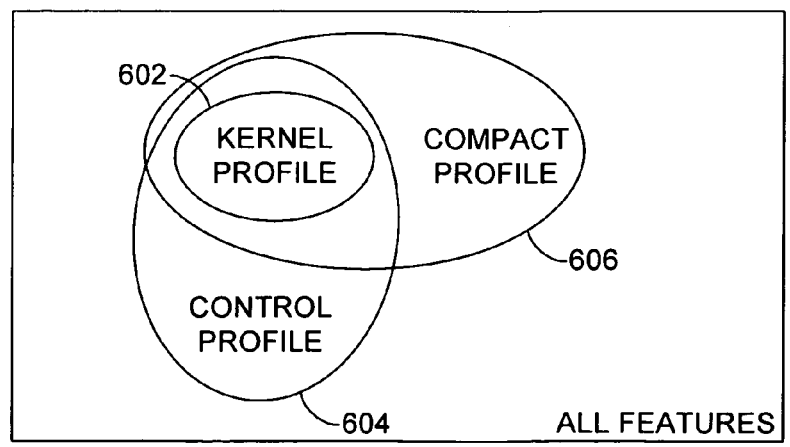
FIG. 6 illustrates example profiles associated with custom attributes for capabilities verification and restriction according to one embodiment of this disclosure.

FIG. 6 illustrates example profiles associated with custom attributes for capabilities verification and restriction according to one embodiment of this disclosure. For ease of explanation, the profiles of FIG. 6 are described with respect to the controller 104a in the process control system 100 of FIG. 1 operating using the execution environment 200 of FIG. 2. The profiles of FIG. 6 could be used by any other suitable device and in any other suitable system.

As described above, capabilities verification and restriction could be based on one or more profiles, where each profile is associated with an attribute. For example, .NET supports custom attributes that represent user-defined attributes capable of providing additional information about program elements. When a custom attribute is created for a method, class, or assembly program, the custom attribute may be embedded into metadata information for that method, class, or assembly program. As a specific example, a custom attribute CONTROL_PROFILE could be created using the following code:

```
namespace HONVERIFY
{
    [AttributeUsage (AttributeTargets.All) ]
    public class CONTROL_PROFILE : Attribute
```

```
    {
        ...
    }
}
```

While writing program code, a user or tool may tag a class or method with this custom attribute as shown in the following code:

```
namespace Demo
{
    [HONVERIFY.CONTROL_PROFILE]
    public class AttributeDemo
    {
        void Function01 ( )
        {
            ...
        }
        void Function02 ( )
        {
            ...
        }
    }
}
```

When compiled, the following entries may be contained in the metadata of the program above:

```
.class private auto ansi beforefieldinit AttributeDemo
    extends [mscorlib] System.Object
{
.custom instance void HONVERIFY.CONTROL_PROFILE::.ctor( )=
(01 00 00 00)
} // end of class AttributeDemo
```

To support capabilities verification and restriction using profiles, each profile defines or identifies the capabilities that can or cannot be used, and each profile is associated with a unique custom attribute. A managed application can be tagged with one of the custom attributes, and the profile associated with that custom attribute is used to perform capabilities verification and restriction for that managed application. FIG. 6 illustrates three overlapping profiles 602-606 that could be used for capabilities verification and restriction. These profiles 602-606 may represent specific examples of the profiles 228 described above. A kernel profile 602 represents the bare minimum features that are often needed to run any application or set of applications. Because of this, all other profiles typically include the kernel profile 602. A compact profile 604 represents a superset of the kernel profile 602. The kernel profile 602 and the compact profile 604 may represent the profiles that have been ratified by ECMA INTERNATIONAL. A control profile 606 in this example is defined to include the kernel profile 202 and to overlap somewhat with the compact profile 604.

Each one of the profiles 602-606 in FIG. 6 could define a subset of the features provided by the execution environment 200, and each profile can be associated with a unique custom attribute. As described in more detail below, one of the profiles 602-606 may be used to pre-compile system libraries 224 and to ensure that managed applications use only the subset of features identified by that profile. The profiles 602-606 shown in FIG. 6 are for illustration, however, and any other or additional profile(s) can be used for capabilities verification and restriction.

Figure 7:
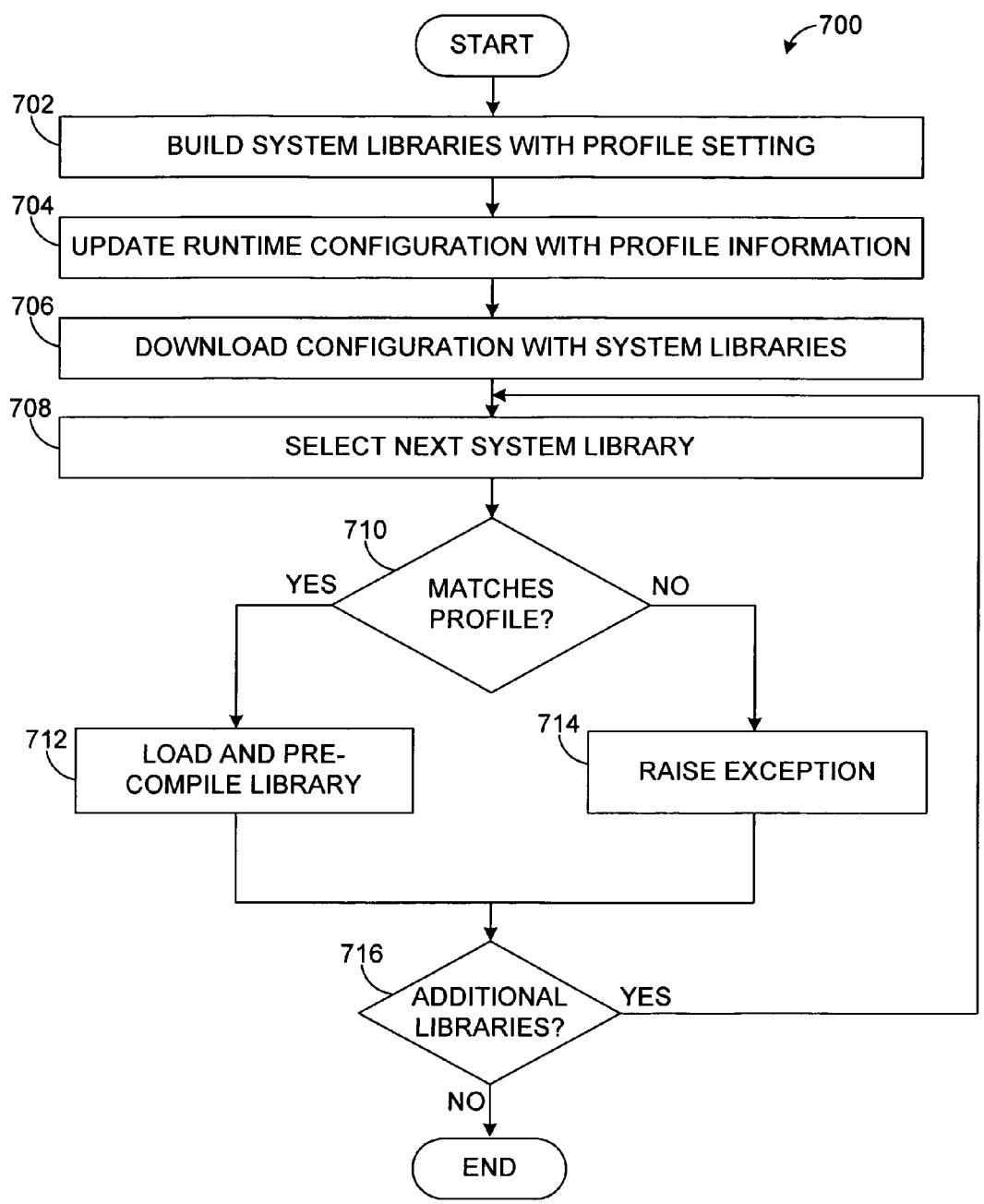
FIG. 7 illustrates an example method for loading and compiling system libraries using profiles associated with custom attributes according to one embodiment of this disclosure.

FIG. 7 illustrates an example method 700 for loading and compiling system libraries using profiles associated with custom attributes according to one embodiment of this disclosure. For ease of explanation, the method 700 is described with respect to the controller 104a in the process control system 100 of FIG. 1 operating using the execution environment 200 of FIG. 2. The method 700 could be used by any other suitable device and in any other suitable system.

One or more system libraries are built using an appropriate profile setting at step 702. This may include, for example, a user initiating a build of the system libraries 224 on an operator station or other user device. The system libraries 224 may be built using the appropriate custom attribute associated with one of the profiles 228. As a particular example, a system library 224 could be built for a particular profile using a pre-processor defined in a header file, such as:
    #define EDOTNET_KERNEL 1
    #define EDOTNET_CONTROL 0
This helps to ensure that code for a particular profile is built using the appropriate custom attribute, which may be characterized as follows:

```
#if EDOTNET_KERNEL
    [KERNEL_PROFILE]
    public class Class1
    {
        ...
    }
#elif EDONET_CONTROL
    [CONROL_PROFILE]
    public class Class1
    {
        ...
    }
#else
    public class Class1
    {
        ...
    }
#endif
```

The runtime environment is updated with the profile information at step 704. This may include, for example, the user providing the execution environment 200 (such as the capabilities verification and restriction controller 222) with information identifying the profile or with the profile itself. This may also include the execution environment 200 storing this information for later use.

A configuration and one or more system libraries are downloaded to a controller at step 706. This may include, for example, the user downloading a configuration (identifying the profile to be used) and one or more system libraries 224 into the memory 107 of the controller 104a.

The controller then uses a selected profile to determine whether to load and compile each of the system libraries. The controller selects the next system library at step 708. This may include, for example, the capabilities verification and restriction controller 222 selecting the next system library 224 received during step 706. The controller determines whether a profile associated with the selected system library (the profile used to build the selected system library) matches the current profile being used by the controller (the profile identified by the configuration) at step 710. If so, the controller loads and pre-compiles the selected system library at step 712. Otherwise, the controller does not load the selected system library, and the controller raises an exception at step 714. If any additional system libraries remain to be processed at step 716, the controller returns to step 708 to select the next system library.

In this way, the controller 104a may only load and compile system libraries that are built using a particular profile. As a result, the system libraries that are actually loaded into the execution environment 200 support only the features specified by that particular profile.

Figure 8:
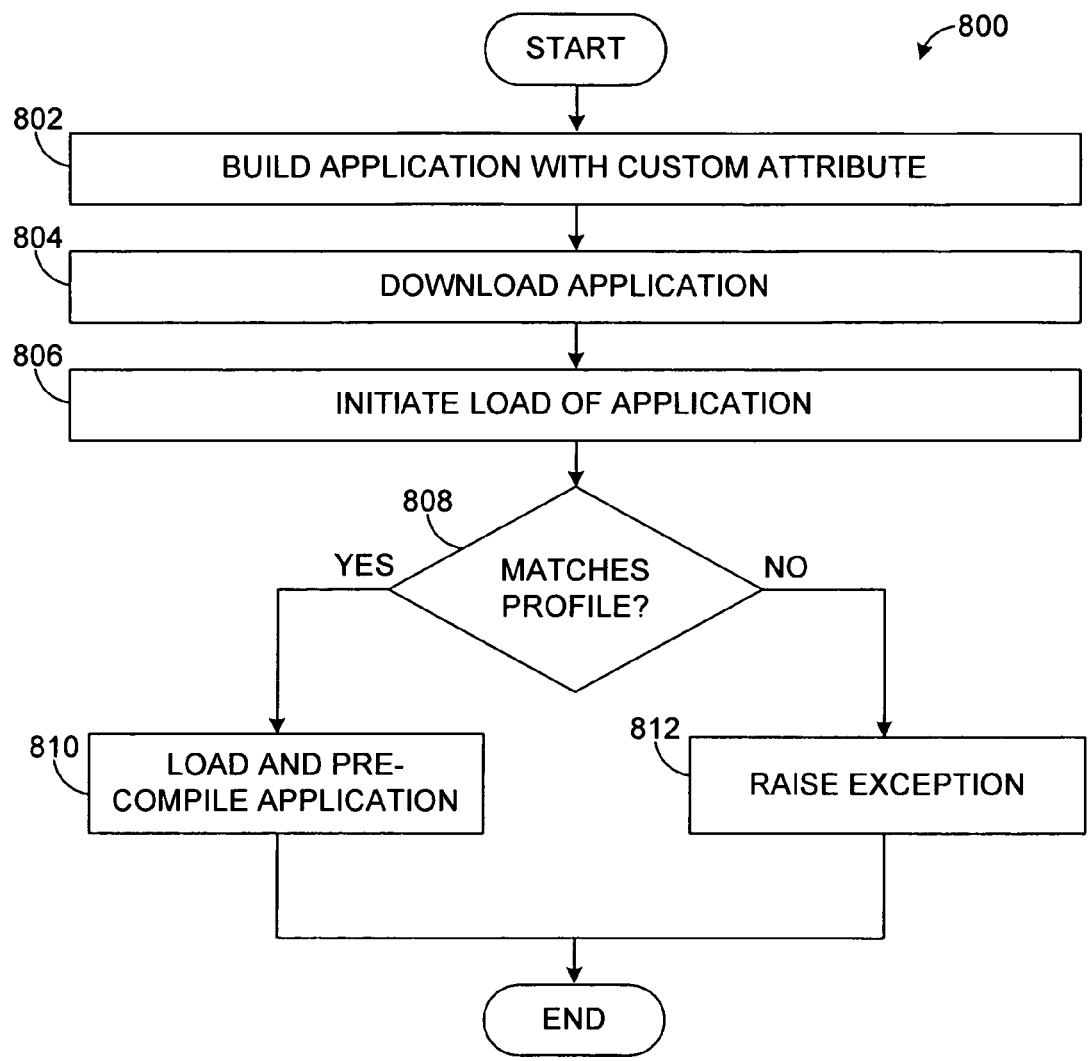
FIG. 8 illustrates an example method for capabilities verification and restriction using custom attributes according to one embodiment of this disclosure.

FIG. 8 illustrates an example method 800 for capabilities verification and restriction using custom attributes according to one embodiment of this disclosure. For ease of explanation, the method 800 is described with respect to the controller 104a in the process control system 100 of FIG. 1 operating using the execution environment 200 of FIG. 2. The method 800 could be used by any other suitable device and in any other suitable system.

A managed application having a custom attribute is built at step 802. This may include, for example, a user using a process builder to build a function block algorithm and to associate a custom attribute with the function block algorithm. The generated application is downloaded to a controller at step 804, and a load of the generated application is initiated at step 806. This may include, for example, the user downloading the function block algorithm into the controller 104a and calling the HON.Assembly.Load( ) method to initiate a load of the function block algorithm in the controller 104a.

The controller determines if the profile of the generated application matches the current profile of the controller at step 808. This may include, for example, the capabilities verification and restriction controller 222 comparing the current profile being used by the controller 104a to the profile identified by the generated application's custom attribute.

If the profile of the generated application matches the current profile of the controller, the generated application is loaded and pre-compiled at step 810. Otherwise, an exception is raised and the generated application is not loaded at step 812.

In this way, the controller 104a may only load and compile system libraries and applications that are designed to use the features associated with a particular profile. As a result, the applications that are actually loaded into the execution environment 200 use only the features specified by that particular profile. Also, the controller 104a does not need to spend time loading and compiling applications that use different profiles before recognizing that an exception should be raised since verification can occur using an attribute (which is available prior to loading or compilation).

Although FIGS. 3 through 8 illustrate various methods and profiles, various changes may be made to FIGS. 3 through 8. For example, while each method is shown as a series of steps, various steps in each method could occur in parallel or could be performed in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method, comprising:
identifying one or more features of a deterministic execution environment to be used by an application during execution, wherein the execution environment comprises a plurality of functions callable by the application and stored in at least one system library, wherein each available function has a corresponding starting memory address stored in a hash table;
determining if use of the one or more features is restricted by determining if each of the one or more features is identified in a configuration list;
selectively pre-compiling into native executable code each of one or more methods identified in the configuration list as being not restricted and available for use in the execution environment;
storing the native executable code in memory and updating the hash table with the starting address of the native executable code, wherein only methods that are determined from the configuration list are pre-compiled into native executable code and included in the hash table, such that restricted methods are unavailable to the application; and
executing the application in the execution environment.

2. The method of claim 1, wherein:
the configuration list identifies at least one of: features that are available for use in the execution environment and features that cannot be used in the execution environment.

3. The method of claim 2, wherein the one or more features comprise the one or more methods provided by the at least one system library.

4. The method of claim 1, wherein determining if use of the one or more features is restricted comprises:
identifying an attribute associated with the application; and
identifying a profile associated with the attribute, the profile identifying at least one of:
features that are available for use in the execution environment and features that cannot be used in the execution environment.

5. The method of claim 4, wherein the one or more features are provided by the at least one system library; and
further comprising pre-compiling each of the at least one system library associated with the profile.

6. The method of claim 4, wherein the profile comprises one of a plurality of profiles, each of the profiles associated with a different subset of features of the execution environment.

7. The method of claim 1, wherein determining if use of the one or more features is restricted occurs after the application has been loaded into a compiler.

8. The method of claim 1, wherein determining if use of the one or more features is restricted occurs before the application is provided to the execution environment.

9. The method of claim 1, wherein the application comprises a function block algorithm executed by a controller in a process control system.

10. An apparatus, comprising:
at least one memory configured to store an application to be executed in an execution environment, wherein the execution environment comprises a plurality of functions callable by the application and stored in at least one system library, wherein each function has a corresponding starting memory address stored in a hash table; and
at least one processor configured to:
identify one or more features of the execution environment to be used by the application during execution;
determine if use of the one or more features is restricted by determining if each of the one or more features is identified in a configuration list;
selectively pre-compile into native executable code each of one or more methods identified in the configuration list as being not restricted and available for use in the execution environment;
store the native executable code in the at least one memory and update the hash table with the starting address of the native executable code, wherein only methods that are determined from the configuration list are pre-compiled into native executable code and included in the hash table, such that restricted methods are unavailable to the application; and
execute the application in the execution environment.

11. The apparatus of claim 10, wherein:
the configuration list identifies at least one of: features that are available for use in the execution environment and features that cannot be used in the execution environment.

12. The apparatus of claim 11, wherein:
the one or more features comprise the one or more methods provided by the at least one system library.

13. The apparatus of claim 10, wherein the at least one processor is configured to determine if use of the one or more features is restricted by:
identifying an attribute associated with the application; and
identifying a profile associated with the attribute, the profile identifying at least one of: features that are available for use in the execution environment and features that cannot be used in the execution environment.

14. The apparatus of claim 13, wherein:
the one or more features are provided by the at least one system library; and
the at least one processor is further configured to pre-compile each of the at least one system library associated with the profile.

15. The apparatus of claim 10, wherein:
the at least one processor is configured to execute the application by loading the application into a compiler in the execution environment; and
the at least one processor is further configured to block execution of the application by stopping compilation of the application and raising an exception.

16. The apparatus of claim 10, wherein:
the at least one processor is configured to execute the application in the execution environment by downloading the application into a second apparatus comprising the execution environment; and
the at least one processor is further configured to block execution of the application by blocking the downloading of the application into the second apparatus.

17. A non-transitory computer readable medium embodying a computer program, the computer program comprising computer readable program code for:
identifying one or more features of an execution environment to be used by an application during execution, wherein the execution environment comprises a plurality of functions callable by the application and stored in at least one system library, wherein each function has a corresponding starting memory address;
determining if use of the one or more features is restricted by determining if each of the one or more features is identified in a configuration list:
selectively pre-compiling into native executable code each of one or more methods identified in the configuration list as being not restricted and available for use in the execution environment;
storing the native executable code in memory and updating the hash table with the starting address of the native executable code, wherein only methods that are determined from the configuration list are pre-compiled into native executable code and included in the hash table, such that restricted methods are unavailable to the application: and
executing the application in the execution environment.

18. The computer readable medium of claim 17, wherein:
the configuration list identifies at least one of: features that are available for use in the execution environment and features that cannot be used in the execution environment.

19. The computer readable medium of claim 18, wherein the one or more features comprise the one or more methods provided by the at least one system library.

20. The computer program of claim 17, wherein the computer readable program code for determining if use of the one or more features is restricted comprises computer readable program code for:
identifying an attribute associated with the application; and
identifying a profile associated with the attribute, the profile identifying at least one of: features that are available for use in the execution environment and features that cannot be used in the execution environment.

21. The computer readable medium of claim 20, wherein the one or more features are provided by the at least one system library; and
further comprising computer readable program code for pre-compiling each of the at least one system library associated with the profile.

22. A method, comprising:
identifying one or more features of an execution environment to be used by an application during execution, wherein the execution environment comprises a plurality of functions callable by the application and stored in at least one system library, wherein each available function has a corresponding starting memory address stored in a hash table;

determining if use of the one or more features is restricted by determining if each of the one or more features is identified in a configuration list;

selectively pre-compiling into native executable code each of one or more methods identified in the configuration list as being not restricted and available for use in the execution environment;

storing the native executable code in memory and updating the hash table with the starting address of the native executable code, wherein only methods that are determined from the configuration list are pre-compiled into native executable code and included in the hash table, such that restricted methods are unavailable to the application; and if use of the one or more features is not restricted, providing the application to an apparatus for compilation and execution of the application in the execution environment at the apparatus.

* * * * *